July 13, 1926.
F. G. BEETEM
1,592,067
SUSPENSION FOR AXLE LIGHTING DYNAMOS
Filed Jan. 29, 1926
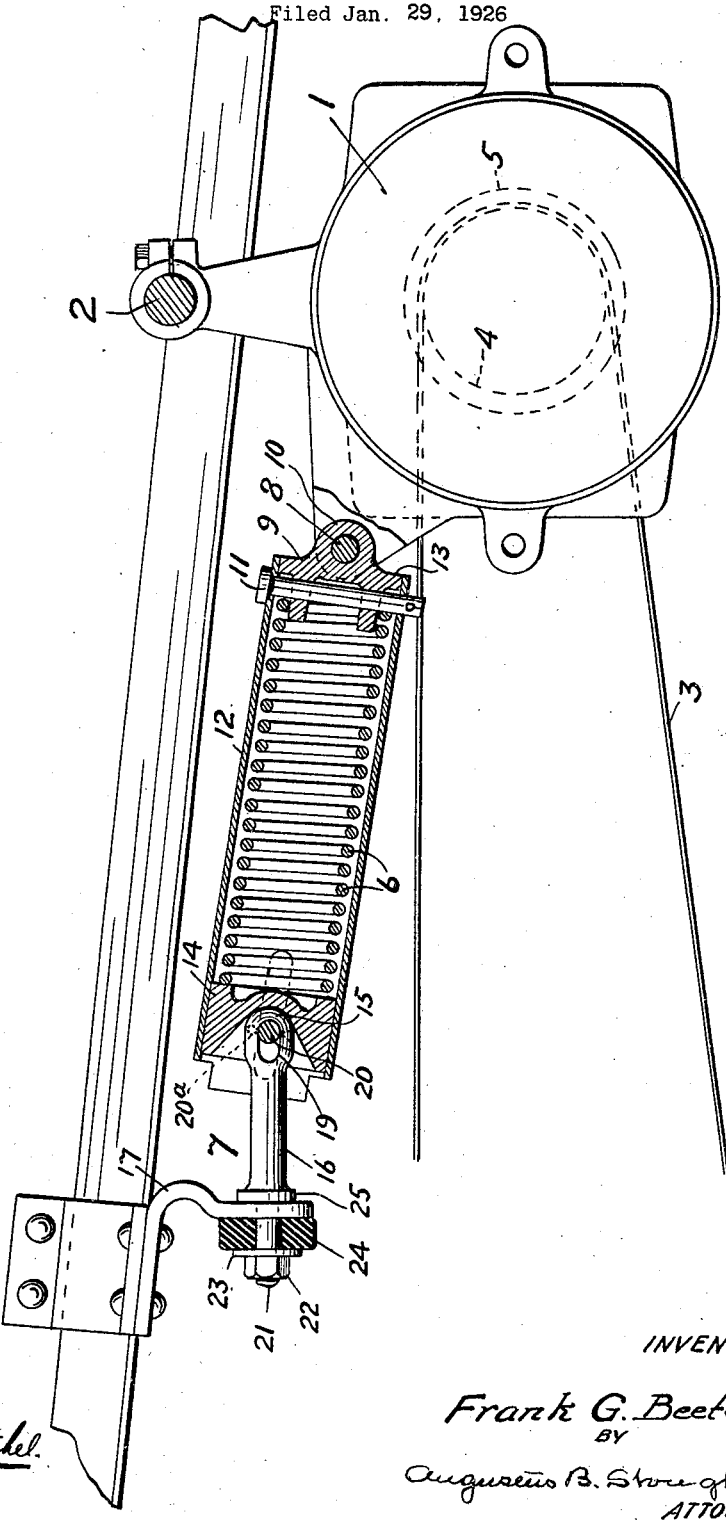
INVENTOR
Frank G. Beetem
BY
Augustus B. Stoughton
ATTORNEY.
WITNESS:

Patented July 13, 1926.

1,592,067

UNITED STATES PATENT OFFICE.

FRANK G. BEETEM, OF PHILADELPHIA, PENNSYLVANIA.

SUSPENSION FOR AXLE LIGHTING DYNAMOS.

Application filed January 29, 1926. Serial No. 84,797.

This invention relates to suspensions for axle lighting dynamos and more especially to improvements in the belt tension spring and spring support, and has for its objects the protection of the belt tension spring from accumulation of ice or snow in winter, the provision for proper alignment of the spring with changes in the position of the dynamo, and provision for relieving the shock and strain on the spring supports when the driving belt breaks. These and other objects will be understood by reference to the following description taken in connection with the accompanying drawing, forming part hereof and which in a simple figure shows one embodiment of the invention partly in side elevation and partly in section.

In the drawing 1 is an axle lighting dynamo suspended from the underframe of the car and arranged to turn about the bearing shaft 2 which is supported from the frame of the car by any suitable means. For the sake of clearness the supporting structure has been omitted as it forms no part in this invention. The dynamo is driven by means of a belt 3 from a pulley mounted on one of the car axles but not shown in the drawing because too well understood by those skilled in the art to require either illustration or description. The belt 3 passes around the armature pulley of the dynamo, whose face is indicated by the circle 4, the belt being retained on the pulley by means of the flange 5. In order to provide the necessary belt tension for driving the armature a compression spring 6 is shown, which at one end has an abutment. A supporting structure generally indicated at 7 and attached to the underframe of the car, and at the other end has as a supporting structure a pin 8 carried by the frame of the dynamo. Between the spring 6 and the bearing pin 8 is interposed a casting or base 9 which is provided with a projecting ear 10 having a hole through which the bearing pin 8 passes whereby the compressive force of the spring is transmitted to the pin. This construction permits the necessary variation in the vertical angle between the axis of the spring and the dynamo as the dynamo swings about the bearing shaft 2. This swinging of the dynamo may be caused by a change in the relative position of the driving pulley when the car passes around curves in the track or it may be due to stretching of the belt in service. It is also possible that the dynamo may be shifted through a slight horizontal angle by suitable adjusting means not shown on the drawing, because too well understood by those skilled in the art, which may be used to change the alignment of the armature pulley with the belt. To provide for this horizontal angular shift a pin 11 is shown passing through suitable holes in the base 9, against which pin 11, the spring 6 bears directly, thus permitting the spring to rock slightly horizontally in either direction with respect to the base 9.

The spring 6 is enclosed in a tube or sleeve 12, which is held in position by the pin 11, being suitably drilled to receive this pin. This tube is also guided at its right-hand end in the drawing by passing over the cylindrical surface of a flange 13 on the base 9. Sufficient clearance is provided between the flange 13 and the tube 12 to permit the latter to shift through a slight horizontal angle with reference to the base 9.

The left-hand end of the spring 6 bears against a casting or base 14, which has a cylindrical surface over which the tube 12 is free to slide. The base 14 is provided with a spherical depression on the side opposite the bearing face for the spring, into which the spherical end 15 of the strut 16 is fitted. The strut 16 is fixed in position with respect to the underframe of the car, being mounted on the supporting bracket 17. The bearing between the spherical head 15 and the base 14 constitutes a ball and socket joint, permitting the spring 6 to assume various angular positions with respect to the strut 16.

The tube 12 near its left-hand end is provided with two oblong slots on opposite sides, one of which is shown by the dotted line 18. The strut 16 is also provided with an oblong slot 19. Through the two slots, 18 of the tube 12 and the slot 19 of the strut 16, is passed a pin 20, which is held in place against endwise detachment at its ends by cotter pins 20$^a$. The pin 20 fits somewhat loosely in the slots 18 and 19 so as not to interfere with considerable angular motion between the tube 12 and the strut 16. The slot 18 is made of sufficient length to permit the tube 12 to slide over the casting 14 as the spring is compressed or extended with the various motions of the dynamo 1. Under normal operating conditions, therefore, the pin 20 performs no function and is subjected to no forces, but rests loosely in the slots 18 and 19.

The strut 16 it attached to the supporting bracket 17 by means of an extension 21 passing through the bracket and provided with a clamping nut 22. Between the nut 22 and the bracket 17 is a metallic washer 23 and a compressible washer 24 of soft rubber or similar material. Under normal conditions this soft rubber washer 24 is under just sufficient compression to hold the strut 16 in place. The strut 16 is provided with a flanged base or collar 25 which provides a bearing against the supporting bracket 17 of considerable diameter, sufficient to insure that a line corresponding with the axis of the spring which represents the direction of the force applied to the strut 16 will always fall within the circle representing the periphery of the flange 25 under all operating conditions.

In case the belt should break the dynamo 1 will be permitted to swing forward, right handed in the drawing, and due to the compressive force of the spring it will in swinging, acquire a very considerable momentum. If the swinging of the dynamo under these conditions is limited by a rigid stop of any kind a very severe shock, in the nature of a hammer blow, will result, which will subject various parts of the dynamo frame and the spring supporting structure to severe stresses. This result is avoided in the apparatus described above by reason of the fact that under conditions of a broken belt when the dynamo swings forward through an abnormal angle the tube 12 will slide forward over the base 14 until the pin 20 comes in contact with the left-hand end of the slots 18 and at the same time engages the right-hand end of the slot 19, thus transmitting the blow to the strut 16. This blow, however, will be relieved by the compression of the soft rubber washer 24, which introduces sufficient resilience to relieve the severity of the shock. The force of this blow is transmitted from the frame of the dynamo 1 through the base or casting 9 and the pin 11 to the tube 12.

It will be noted that the tube 12 performs several functions, as it not only protects the spring 6 from an accumulation of ice and snow in winter, which might fill up the spaces between its convolutions and render it inoperative, but it also acts as a guide for this spring preventing it from buckling laterally and it likewise serves to transmit the shock from the dynamo to the supporting structure in the case of a broken belt. It also serves as a guide for the casting 14, confining its motion to lineal travel along the axis of the spring.

Having described one embodiment of my invention, what I claim is:

1. In combination in a suspension for axle lighting dynamos a pivotally suspended belt driven dynamo, a compression spring, a base pivoted to the dynamo frame, and against which the spring abuts at one end, a support, a base bearing with angular freedom upon said support and against which the other end of the spring abuts, and a sleeve surrounding the spring and attached to one of the bases and longitudinally guided by the other of said bases.

2. In combination in a suspension for axle lighting dynamos, a pivotally suspended belt driven dynamo, a compression spring, a base pivoted to the dynamo frame and against which one end of the spring abuts, a support, a base bearing with angular freedom upon said support and against which the other end of the spring abuts, a sleeve surrounding the spring and pivotally attached to the first mentioned base and longitudinally guided by the other base, said sleeve extended to surround a portion of the support, aligned openings provided in the sleeve and the support, and a pin passing through the openings with clearance to permit relative longitudinal motion between the sleeve and the support and to stop the swing of the dymano at a predetermined point in its travel away from the support.

3. In combination in a suspension for axle lighting dynamos, a pivotally suspended belt driven dynamo, a compression spring, a base pivoted to the dynamo frame and against which the spring abuts at one end, a support, a base bearing with angular freedom upon said support, a sleeve surrounding the spring and pivotally attached to the first mentioned base and longitudinally guided by the other base, said sleeve extended to surround a portion of the support, aligned openings provided in the sleeve and the support, a pin passing through the openings with clearance to permit relative longitudinal motion between the sleeve and the support and to stop the swing of the dynamo at a predetermined point in its travel away from the support, and a resilient member co-operating with the support and adapted to relieve the strain caused by thus stopping the swing of the dynamo.

4. In a suspension for axle lighting dynamos, a pivotally suspended belt driven dynamo, a fixed bracket, a spring normally in compression, a sleeve surrounding the spring, a base pivoted to the dynamo and to one end of the sleeve and against which one end of the spring abuts, a strut slidable through the bracket and having a collar on one face of the bracket, a resilient washer on the other face of the bracket and between it and a head provided on the strut, a second base having universal motion connection with the end of the strut and against which the other end of the spring abuts, normally pressing the collar against the bracket, and slot-and-pin sliding connections between the last mentioned base and strut and sleeve to limit the outward swing of the dynamo and to transfer the shock thereof to the washer.

FRANK G. BEETEM.